Figure 1:
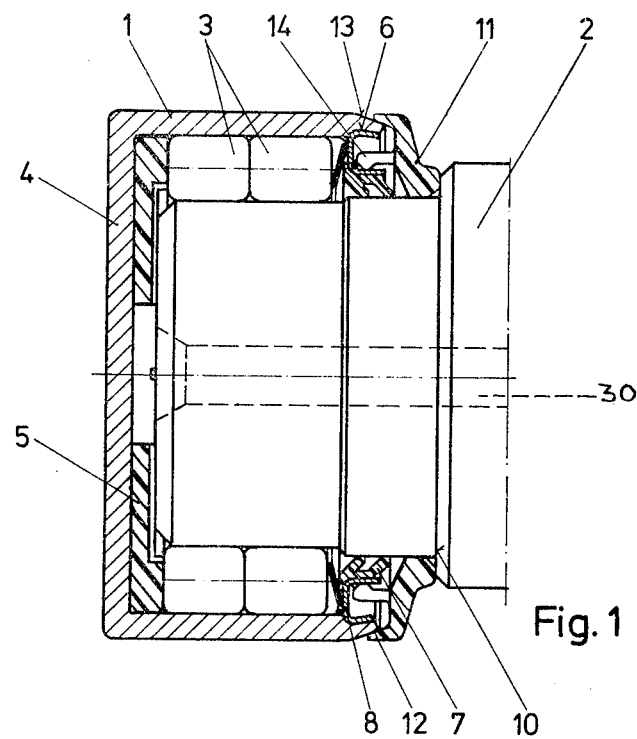

United States Patent [19]

Negele et al.

[11] 4,312,547
[45] Jan. 26, 1982

[54] SEAL FOR BEARINGS

[75] Inventors: Richard Negele, Esslingen-Rudern; Wilhelm Birkenmaier, Weinstadt, both of Fed. Rep. of Germany

[73] Assignee: SKF Kugellagerfabriken GmbH, Schweinfurt, Fed. Rep. of Germany

[21] Appl. No.: 127,808

[22] Filed: Mar. 6, 1980

[30] Foreign Application Priority Data

Mar. 6, 1979 [DE] Fed. Rep. of Germany ....... 2908713

[51] Int. Cl.³ ............................................. F16C 33/78
[52] U.S. Cl. ................................ 308/187.1; 308/187.2
[58] Field of Search ................. 308/187.1, 187.2, 36.1, 308/36.2, 187, 207 R; 277/212, 212 R, 212 C, 212 F

[56] References Cited

U.S. PATENT DOCUMENTS

| | | | |
|---|---|---|---|
| 3,792,912 | 2/1974 | Howe et al. | 308/187.2 |
| 3,854,734 | 12/1974 | West | 308/187.2 |
| 4,139,203 | 2/1979 | Garrison | 308/187.2 |
| 4,249,782 | 2/1981 | Frank | 308/187.1 |

*Primary Examiner*—Lenard A. Footland
*Attorney, Agent, or Firm*—Daniel M. Rosen

[57] ABSTRACT

A bearing in which a cylindrical pin extends axially into a bearing shell, and is separated therefrom by rolling elements. A first annular seal includes an annular support body having a U-shaped cross-section and fitted into a recess in the open end of the bore of the shell, and a flexible first seal affixed to the support body and slidingly engaging the cylindrical surface. A second annular seat has a lip engaging an inclined surface at the open end of the shell, and extends to slidingly engage the cylindrical surface. An annular collar of the second seal extends into the open end of the support body, to engage an annular surface therein. The collar is radially slit.

10 Claims, 2 Drawing Figures

SEAL FOR BEARINGS

BACKGROUND OF THE INVENTION

This invention relates to seals for bearings, especially for universal joints. Such bearings are comprised of a bearing element, such as a shell, with a sealing ring arranged in the bore of the shell. The sealing ring extends to engage, with its sealing surface, the cylindrical surface of a machine element positioned within the bearing element. The machine element may be the pin of the universal joint. Arrangements of this type further comprise an additional elastic sealing ring positioned between the open end of the bearing element and a shoulder on the machine element, the sealing rings and bearing elements constituting a prefabricated element.

A sealing ring of this type, for bearings for universal joints, is disclosed in DE-OS No. 2,144,172. Therein is described a seal consisting of two sealing rings, of which one is arranged in the cylindrical bore of the bearing element, the bore also serving as the race for the rolling bodies. The sealing ring extends between the face sides of the rolling bodies and a restraining flange in the bore of the bearing element. The other sealing ring is arranged between the open end of the bearing element and a shoulder on the universal joint pin which extends into the bearing. This other sealing ring is provided with projections or a circular collar which grip under the restraining flange of the bearing element. The sealing rings are thus combined with the bearing element to form a prefabricated unit.

This known arrangement has the disadvantage that the edge between the end of the bearing element and the rolling bodies can be flanged only after the fabrication of the bearing. For this purpose, the region of the edge of the bearing element is not hardened. This requires that either this zone is masked in the hardening of the bearing, or that a supplementary annealing process be employed. In addition to the increased expense of this additional process step, there is the danger that the hardness of the race for the rolling bodies will be adversely affected. Further, this known arrangement has the disadvantage that the length of the bearing element is relatively large in view of the necessity for providing the restraining flange, and the production of the bearing is thereby rendered more difficult. Finally, the known arrangement has the disadvantage that the escape of air in the bearing, and of excess lubricating material is hindered during the pressing of the bearing element and the seals thereon onto the universal joint. Consequently, there is the danger that during the pressing of the bearing element on the universal joint pin, or in the prefabricated condition following lubrication of the rolling element through the high pressure of the part or seal, damage or destruction of the element can result. On the other hand, in spite of the use of high pressure for the forcing of lubricating material into the bearing, it is not assured that all hollow spaces of the bearing will be filled with the lubricating material.

In order to avoid these disadvantages, DE-OS No. 2,718,503 describes a sealed universal joint in which an elastic sealing ring is provided between the open end of the bearing and a shoulder of the universal joint pin. The elastic sealing ring forms a part of the assembly of the bearing, and is provided with an axially extending air escape groove. The groove is sealed to the modified end of the bearing element preferably by means of an elastic sealing lip cooperating with the shoulder of the universal joint, against outside influence. In this arrangement, the space in the presealing lip is not filled with grease. Further, this known arrangement has a complicated shape, which therefore requires the relatively complicated and consequently expensive tools for its production.

It is therefore the object of this invention to provide a sealing arrangement for a bearing, which employs a simple construction for the individual sealing element as well as simple technique for affixing them to the bearing element, to form a prefabricated unit. It is further the object of this invention to provide a sealing arrangement wherein lubrication under high pressure is permissible, and the lubricant flows into the bearing with a higher speed, without resulting damage or destruction of the part, and also wherein lubrication of all of the hollow spaces of the bearing is provided even with the use of a small pressure.

SUMMARY OF THE INVENTION

In order to achieve the above objects, in accordance with the present invention, a bearing is provided wherein an axially extending sealing ring is arranged between the open end of the bearing shell and a shoulder of the machine part which extends into the bearing. The sealing ring has an annular collar which is arranged either on or in the sealing ring mounted in the bore of the bearing. The mounting can be effected by engaging the ring-shaped collar on the annular surface with a prestress. It is also possible, however, that the ring-shaped collar and the annular surface be provided with projections that are radially opposite one another and mesh with one another. In this manner the serially arranged seals are connected with the sealing ring mounted in the bearing shell, to form an individual unit without the necessity of providing a flanged edge or the like on the bearing element. The sealing ring arranged in the bore of the bearing element or shell can be mounted in a groove in the bore of the bearing shell, or can be affixed in the axial direction by a radially inwardly inclined collar of the bearing.

In accordance with a further feature of the invention, the sealing ring arranged in the bore of the bearing shell comprises a support body having a substantially U-shaped cross-section, and a sealing body of elastic material affixed thereto. The sealing body is provided with sealing lips or the like, which extend radially inwardly to engage the machine element. An arm of the U-shaped cross-section support body serves as the annular supporting surface for the axially directed ring-shaped collar of the other sealing ring. In order to enable the escape of air from the inner spaces of the bearing, and to enable the lubricant to pass therein, to thereby fill all hollow spaces of the bearing and the seals, in accordance with a further feature of the invention the ring-shaped collar of the series seal is provided with slits extending radially therethrough. Air and also the lubricant medium can escape by way of these slits. The flow resistance for the lubricant material can be controlled, as required, by the number and width of the slits, as well as by the width of the gap between the collar and the U-shaped support body.

In order that the invention will be better understood, it will now be disclosed in greater detail with reference to the accompanying drawings.

DESCRIPTION OF THE DRAWINGS AND PREFERRED EMBODIMENT

Figure 2:
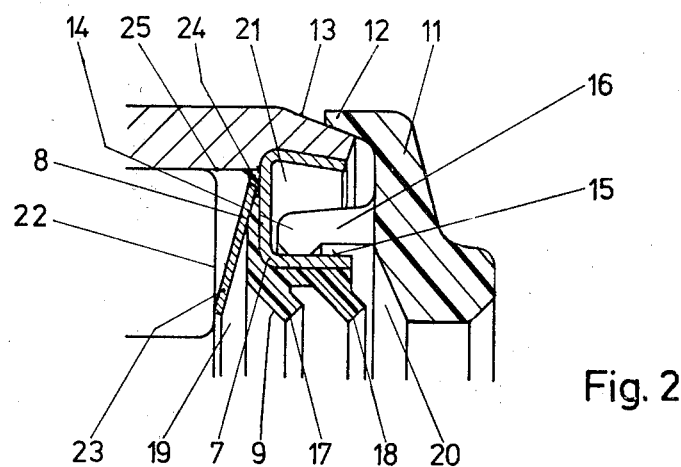

FIG. 1 is a longitudinal cross-section of a bearing incorporating a seal in accordance with the invention; and FIG. 2 is an enlarged view of a portion of the bearing of FIG. 1.

Referring now to FIG. 1, the outer shell 1 of a bearing is supported on the cylindrical pin 2 of a universal joint by means of intermediate cylindrical roller bearings 3. The bearing shell 1 has a closed end 4 extending over the end of the pin 2. A layer 5 of antifriction material is provided between the end 4 of the bearing shell and the end of the pin 2, in order to provide axial support for the universal joint pin 2. A preferably annular recess 6 is provided on the inner edge of the open end of the bearing shell 1, that is, in the bore of the shell 1, and an annular sealing ring 7 is closely fitted in this recess. The sealing ring 7 is comprised of annular support body 8, for example of sheet metal, having a U-shaped cross-section, the arms of the cross-section extending generally axially with the radially outer arm engaging the recess 6. The sealing ring 7 further includes a sealing body 9 of elastic material affixed to the support body 8. The open end of the U-shaped cross-section of the support body 8 is directed axially outwardly of the bearing, and the sealing body 9 is affixed to the bottom surface and radially inner arm surface of the support body 8.

As illustrated in FIG. 1, the universal joint has a shoulder 10 axially spaced from the open end of the shell 1, and a further sealing ring 11 is provided between the open end of the shell 1 and the shoulder 10 of the universal joint. The sealing ring 11 has an annular lip 12 at the radial extremity thereof toward the shell 1, the lip 12 extending radially over and engaging an inclined outer annular surface 13 at the open end of the shell 1. In other words, the annular inclined surface 13 extends radially inwardly toward the open end of the shell, and the radial inner surface of the lip 12 sealingly engages the inclined surface 13. The sealing ring 11 has a collar 14 extending axially inwardly of the bearing, the collar 14 being generally annular and extending into the open end of the U-shaped support body 8 to engage the annular surface 15 of the radially inner arm thereof. The annular collar 14 of the sealing ring 11 is provided with several slits 16 extending radially therethrough, as illustrated more clearly in FIG. 2.

As further illustrated in FIG. 1, the radially inner surface of the sealing ring 11 engages the pin 2 of the universal joint and the adjacent shoulder 10. The sealing ring 9 has a pair of axial spaced sealing lips 17 and 18 at its radially inner surface, the sealing lip 17 and 18 are directed toward the shoulder 10 of the universal joint.

The bearing of the present invention is lubricated in the conventional manner for universal joints, that is, by forcing a lubricant from a fitting (not shown) of the universal joint, through a central hole 30 in each of the arms thereof. In the lubrication of the bearing, after the assembly thereof on the universal joint pin, air and lubricant from the bearing inner space 19 (see FIG. 2) can escape by way of the sealing lips 17 and 18 to the space 20 between the sealing lip 18 and the collar 14 of sealing ring 11. From there, air and lubricant can escape through the radially extending slits 16 to the space 21 above the collar 14 and between the support body 8 and sealing ring 11. Finally the air and lubricant can escape from the interior of the bearing in a gap between the surface 13 and the sealing lip 12, forming by bulging of the sealing lip 12 of the sealing ring 11 under pressure.

Since the sealing lips 12, 17 and 18 are elastically flexible, a high pressure is not required in order to force the lubricant material into the bearing and into all of the hollow spaces of the bearing and the seal. As a result, the damage and destruction of the bearing are reliably avoided. All hollow spaces of the seal are filled with lubricant, such as grease, so that the penetration of dirt or contaminants into the interior space of the bearing is prevented with certainty, in spite of the provision of the sealing lip 12.

In the illustrated embodiment of the invention, as shown in FIG. 2, a cup spring 23 is arranged between the flat end surface 22 of the cylindrical roller bodies 3 and the sealing ring 7. The cup spring 23 urges the rolling bodies 3 in the axial direction to press against the antifriction layer 5, and thereby serve for the axial guiding of the cylindrical rolling bodies without the necessity of providing a cage in the bearing. The cup spring 23 is supported on an annular surface of the sealing body 9, and presses the radially outer edge region 24 of the sealing body 9 against the corner between the race 25 in the bore of the shell 1 and the support body 8, so that a complaint-free seal is provided in this region.

The annular collar 14 of the sealing ring 11 lies under prestress on the annular surface 15 of the radially inner arm of the U-shaped support body. This prestress causes, as a rule, an adequate connection between the sealing ring 11 and the sealing ring 7 fitted in the bore of the bearing, so that the shell and seals comprise a prefabricated unit. It should not remain unmentioned that this connection can be improved by providing the ring-shaped collar 14 with radially inwardly directed projections and providing the radially inner arm of the support body 8 with radially outwardly directed projections whereby these projections intermesh with one another and thereby secure the sealing ring 11 to the sealing ring 7, and thereby with the bearing shell 1. For example, the free end of the radially inner arm of the support body 8 may have radially outwardly extending projections positioned to inhibit axial separation of the sealing ring 11 and sealing ring 7, since the free end of the collar 14 extends radially inwardly as shown, to enable axial meshing with such projections on the support body 8.

The invention thereby provides a prefabricated element consisting of the bearing shell, a sealing ring positioned therein, as well as an additional seal in series with the sealing ring. In this arrangement the bearing shell has no supplementary restraining flange for holding the components together, and hence avoids the expense of providing such a flange. The invention provides a relatively simple sealing ring having an easily produced cross-section, and the structure simplifies the removal of air and the introduction of lubricating material in the bearing.

While the invention has been disclosed and described with reference to a single embodiment thereof, it will be understood that variations and modifications may be made therein, and it is intended in the following claims to cover each such variation and modification as falls within the true spirit and scope of the invention.

What is claimed is:

1. In a bearing wherein a machine element has a cylindrical surface, a bearing element surrounds said cylindrical surface, a first sealing ring is provided in the bore of the bearing element, the sealing ring sealingly engaging said cylindrical surface, and wherein a second elastic sealing ring is provided between an open end of the bearing element and a shoulder of the machine element adjacent the cylindrical surface, the bearing element, first sealing ring and second elastic sealing ring forming a unitary component; the improvement wherein said second elastic sealing ring has an axially extending ring-shaped collar extending into said open end of said bearing element, said first sealing ring having an annular surface, said collar engaging said annular surface of said sealing ring.

2. The bearing of claim 1 wherein said ring-shaped collar and annular surface have radially directed projections that extend toward one another and engage one another.

3. The bearing of claim 1 wherein said first sealing ring is comprised of a support body having a substantially U-shaped cross-section, and an elastic seal body affixed thereto, whereby an arm of the U-shaped body serves as said annular surface for the support of the ring-shaped collar of said second elastic sealing ring.

4. The bearing of claim 1 wherein said ring-shaped collar has slits extending radially therethrough.

5. The bearing of claims 1-4 wherein said first sealing ring in the bore of the bearing element is held in an annular recess or groove in said bearing element.

6. The bearing of claim 1 wherein said machine element is a pin of a universal joint, and said bearing element comprises a bearing sleeve having an open end into which said pin extends, and a closed end covering the end of said pin.

7. The bearing of claim 6 further comprising rolling bodies between said shell and cylindrical surface, an antifriction layer in the closed end of said bearing element, and a cup-shaped spring in the bore of said shell resiliently extending between said rolling bodies and said first sealing ring.

8. A bearing comprising a bearing shell having an open end and a closed end, a cylindrical pin extending axially into said shell and having a shoulder spaced outwardly of said shell, a plurality of rolling elements between said cylindrical surface and the bore of said shell, an annular recess in said bore at said open end, the outer surface of said open end comprising an inwardly inclined surface, sealing means comprising an annular U-shaped cross-section support body held in said recess with the open end directed outwardly of said shell, said support body having an inner annular support surface, and a first annular seal affixed to said support body and sealingly engaging said cylindrical surface, a second annular seal having a lip engaging said inclined surface, said second seal slidingly engaging said cylindrical surface and shoulder, said second seal having a radially slit annular collar extending into said open end of said support body and engaging said annular support surface.

9. The bearing of claim 8 comprising a cup spring in said bore resiliently engaging the ends of said rolling elements and the axially inward surface of said sealing means.

10. The bearing of claim 9 wherein said first annular seal extends on the axial inner surface of said sealing means, whereby said cup spring urges said first annular seal against said bore.

* * * * *